L. HOWE.
Construction of Cisterns.
No. 145,802. Patented Dec. 23, 1873.
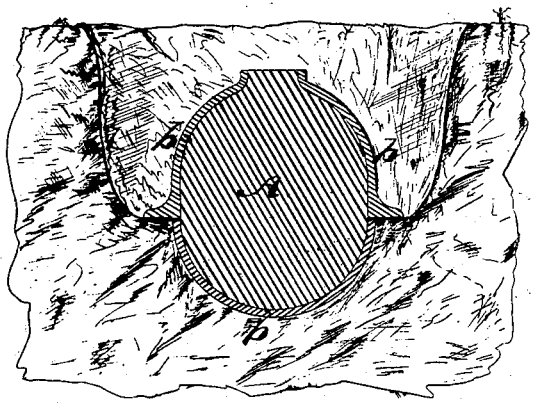
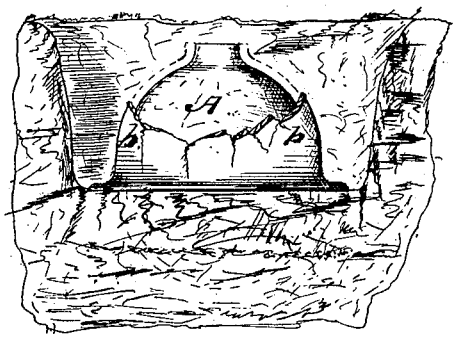
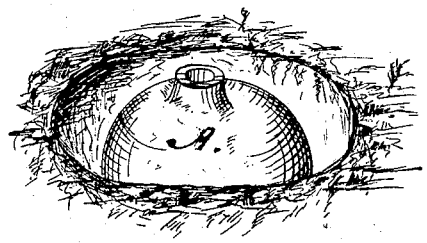

UNITED STATES PATENT OFFICE.

LUTHER HOWE, OF OSHTEMO, MICHIGAN.

IMPROVEMENT IN THE CONSTRUCTION OF CISTERNS.

Specification forming part of Letters Patent No. 145,802, dated December 23, 1873; application filed November 29, 1872.

*To all whom it may concern:*

Be it known that I, LUTHER HOWE, of Oshtemo, in the county of Kalamazoo, State of Michigan, have invented certain Improvements in the Construction of Cisterns for Holding Water, of which the following is a specification:

My invention relates to the construction of cisterns for holding water by forming, from the earth where it is desired to construct a cistern, a mold of any desirable size and of an egg-shape, which mold I sprinkle lightly with water to give smoothness and compactness to the surface thereof. I then apply to the mold a coat of water-cement of a uniform thickness, of from two to four inches, depending upon the size of the cistern, forming the mouth of the cistern at the top of such size as may be desired. After giving the cement from twelve to twenty-four hours to harden, I throw out the mold of earth through the mouth of the cistern, and then form the bottom of the latter of a concave shape by commencing at the center thereof and applying a coat of water-cement, and firmly and completely uniting the same with the upper portion of the cistern, formed as already described.

Figure I is a view of the mold of earth, A, ready to receive the coating of water-cement. Fig. II is a vertical section of the mold A with the coating of water-cement *b b b* applied. Fig. III represents the mold A, with a portion of the water-cement coating removed. Fig. IV is a perspective view of cistern A after application of coating of water-cement and removal of mold, and ready for the filling in of excavation.

I claim as my invention—

The herein-described method of constructing a cistern, namely, by forming a mold of earth, coating the same with water-cement, which is allowed to harden, excavating the mold, and completing the cistern by lining the lower portion of the excavation with water-cement joined to the edges of the upper portion, substantially as specified.

LUTHER HOWE.

Witnesses:
ROBERT F. JUDSON,
WILLIAM GREEN.